Feb. 20, 1951     A. M. ICKLER     2,542,252

GAME RING

Filed April 16, 1947

*INVENTOR.*
Alfred M. Ickler
BY Louis Chayka
*ATTORNEY*

Patented Feb. 20, 1951

2,542,252

UNITED STATES PATENT OFFICE 2,542,252

GAME RING

Alfred M. Ickler, Mount Clemens, Mich.

Application April 16, 1947, Serial No. 741,916

2 Claims. (Cl. 273—148)

My improvement pertains to rings which have a value both as an educational device and as an item of social entertainment. Specifically my improvement pertains to rings to be produced in sets, including a plurality of pairs, each ring having means limiting its operative use or application to the mate of the pair. Thus, in a social function such as a party, the rings, in pairs, may be used to determine individual guests to be associated in pairs, that is the rings may be used as a means of identifying a female partner for a male guest, and vice versa. More specifically, a person having picked out a ring from a container, is to match the ring with another, held by another person. If the means on the ring fit those of the other, the persons holding the respective rings are associated for the purpose of the specific entertainment be it a dance, a hike, the seating at the dinner table, or such similar purpose.

As an educational device, the rings are of value in teaching children by stimulating their mental effort in matching the relative sizes and positions of means on one ring to fit into corresponding means on the other rings.

A further purpose of my improvement was to make my rings simple in design and economical in cost.

I shall now describe my improvement with reference to the accompanying drawings in which, Fig. 1 is a perspective view of a pair of my rings in their disjointed relation to each other;

Similar numerals refer to similar parts throughout the several views.

Figure 1:
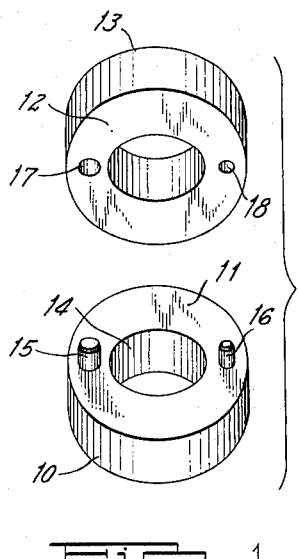
Figure 2:
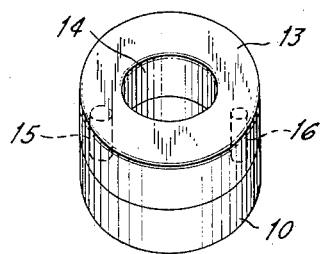
Fig. 2 is a perspective view of the rings in their joined or engaged position.
Figure 3:
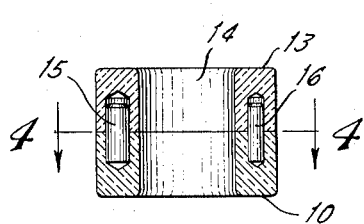
Fig. 3 is a vertical sectional view of a pair of rings in their engaged position.
Figure 4:
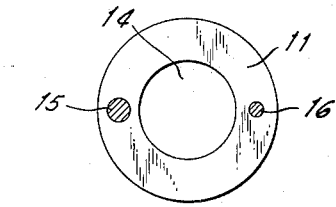
Fig. 4 is a partly sectional view on line 4—4 of Fig. 3.

The rings may be made of any suitable material such as wood, or which is preferable, of plastic. As designed by me the rings are provided with flat surfaces at top and bottom, although the limitation is not critical. As indicated above, the rings come in pairs, and for the purpose of their description herein, it may be considered that one of them is a base ring while the other may be considered as a top ring. Referring to this relative position of the rings, I shall identify their respective top and bottom surfaces as follows: The bottom surface of the base ring is marked 10; its upper surface 11. The bottom surface of the top ring is 12, while the upper surface of said top ring is marked 13. The central apertures 14 are identical in both rings.

The base ring, it will be noted, is provided with two pegs 15 and 16, the pegs rising from the upper surface of the ring, and being alined diametrically thereon. The pegs are cylindrical in shape but of different sizes, being in this case of different diameters but reaching upwardly to the same level. The mate of the base ring, that is the upper ring, is provided in its bottom surface with apertures 17 and 18 respectively, said aperture 17 being of a size to receive peg 15, while aperture 18 is of the right size to receive peg 16. The apertures will fit the pegs in the order stated but not in a reverse order.

In a set of say, six pairs of rings, the diameters of the pegs and the diameters of the apertures in the complementary rings, would have to be varied so as to restrict each of the base rings for operative engagement with only one of the top rings. This, for example could be done by starting with two pegs for one ring, and employing in other rings, set out as a series, pegs, one of which would be somewhat larger than the corresponding peg in the preceding ring, while the other peg would be somewhat smaller than the corresponding peg in the preceding ring.

Figure 5:
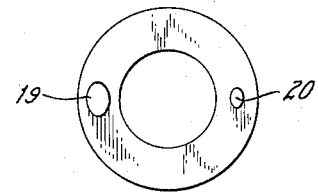
Fig. 5 is a top elevational view of a modified species of my ring.
Figure 6:
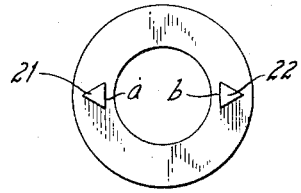
Figs. 6 and 7 are other species of my rings, shown in top elevation.
Figure 7:
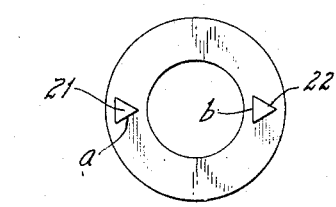

A variation in the shape of the pegs, is shown in Fig. 5 wherein the pegs are oval in cross section. In Figures 6 and 7, the pegs are angular in shape permitting a large variety of combinations of the pegs even were they of the same size. Even a twist of one peg around its longitudinal axis, would be sufficient to form a new combination with the opposite ring, permitting entry of the pegs into corresponding apertures only on proper alinement of the angular pegs with respect to said apertures. Thus in Figure 6 triangular pegs 21 and 22, being of the same size are arranged so that respective sides thereof a, and b are parallel to each other. In Figure 7 peg 21 is shown in a different position so that side a is no more parallel as above.

Other variations in relative sizes of the pegs and their positions, may be devised just as easily.

Having described my improvement, what I wish to claim is as follows:

1. A game comprising a plurality of rings coming in pairs, each pair consisting of two substantially flat rings of the same size, one of said rings having on its surface facing the opposite ring two pegs spaced from each other, while the other ring has on the side facing the pegs, two apertures in the same spacing from each other as the spacing between said pegs, and in the shape and size to fit only said pegs but no pegs of any other pair.

2. A game comprising a plurality of pairs of rings, each pair consisting of two solid, substantially flat rings in face to face abutment, one of the faces having two diametrically disposed apertures, the other face having two diametrically disposed pegs to fit frictionally into said apertures for joinder of the rings as a pair, the size and shape of the pegs differing in each pair of rings, allowing only the joinder of the component rings of the same pair.

ALFRED M. ICKLER.

REFERENCES CITED

The following references are of record in the file of this patent:

UNITED STATES PATENTS

| Number | Name | Date |
| --- | --- | --- |
| 589,822 | Estell | Sept. 14, 1897 |
| 1,396,379 | Moore | Nov. 8, 1921 |
| 1,475,734 | Anthon | Nov. 27, 1923 |
| 2,282,128 | Gubbins | May 5, 1942 |